UNITED STATES PATENT OFFICE.

JOSEPH McFETRIDGE, OF VANDERGRIFT, PENNSYLVANIA.

PROCESS OF TREATING SULFID ORES CONTAINING COPPER.

959,578. Specification of Letters Patent. Patented May 31, 1910.

No Drawing. Application filed November 21, 1908. Serial No. 463,908.

*To all whom it may concern:*

Be it known that I, JOSEPH McFETRIDGE, a resident of Vandergrift, in the county of Westmoreland and State of Pennsylvania, have invented a new and useful Improvement in Processes of Treating Sulfid Ores Containing Copper, of which the following is a specification.

This invention relates to a process of treating copper pyrites, sulfid ores and mattes.

The object of the invention is to simplify and cheapen the process of treating such ores, and to recover the copper from same.

According to prior methods the copper bearing pyrites, sulfid ores or mattes were crushed to egg size lumps, and the fine portion of ore removed by passing the crushed mass over $\frac{1}{4}$ to $\frac{1}{2}$ inch sieves. The fine ore will range in size from fine powder to pea size lumps and is known to the trade as fines. The screened ore is burned separately in shelf burners or mechanical furnaces or roasted in heaps, and the lump ore is burned in kilns, for the purpose of eliminating the sulfur preparatory to smelting or the extraction of copper by the wet or chlorination process.

During the process of eliminating the sulfur, a large percentage of the copper sulfid segregates, and in the case of low grade ore is found as a small granule of high copper value in the center of each lump of ore. When the burned ore is of low copper value it is ground with the addition of salt and roasted for 9 to 15 hours for the purpose of converting the copper into sulfate and later into chlorid by the mutual decomposition of the copper sulfate and sodium chlorid. The copper is then dissolved by lixiviation with water and dilute acids and the copper recovered as cement copper by precipitation with metallic iron. This is known as the chlorination or wet extraction process and is used on ore of low copper value. The high grade lump ore is usually taken direct from the kilns and treated in a blast furnace, and the fine ore first agglomerated and then treated in a blast furnace. In either case the process is slow and expensive and requires two heatings and in one also requires the addition of salt thereto.

According to my process the copper bearing pyrites, sulfid ore or mattes are ground to an impalpable powder or at least to a very fine state of division. The fine ore is then subjected to heat to drive off the sulfur as sulfurous acid and simultaneously converting the copper into oxid and sulfate, the percentage of sulfate and oxid depending on the temperature and air regulation. The burning can be done in any suitable furnace, but preferably in a long cylindrical furnace or shaft heated to a temperature high enough to at once ignite the sulfur. The ore being in such a fine state of division the copper sulfid cannot aggregate but is distributed through the mass and like the iron sulfid gives up sulfur to form sulfurous acid.

When high grade ore is used it is fed into the furnace by a fan or blower suction, or by air blast, with sufficient air to instantaneously burn the sulfur and generate heat enough to agglomerate the ore for blast furnace use or ground and afterward lixiviated. With ore of low copper value, such as used for the chlorination or wet extraction process, the temperature can be so regulated that the ore is not agglomerated but the fine ore is carried along with the air and sulfurous acid produced by the combustion of the sulfur, and by contact catalytically converting the sulfurous acid into sulfuric anhydrid. This, however, is not claimed in this application but is claimed in a companion application of even date Serial No. 463909.

During the burning of the finely divided ore the copper is converted into oxid and sulfate, and by the intimate contact with the sulfurous acid and sulfuric anhydrid a large percentage is converted into sulfate. The finely divided ore is collected in a suitable dust collector and taken to the lixiviating tanks and the copper extracted with water and dilute acid and recovered as cement copper by precipitating with metallic iron in the usual way.

According to my process the high grade ore is agglomerated simultaneously with the burning of the sulfur, dispensing with one furnace treatment, and in the case of low grade ore the use of salt and chlorination roast is dispensed with.

In carrying out my process any suitable form of apparatus may be used. If a rotary furnace or shaft is used the pulverulent ore is fed into the upper end and a suitable dust chamber or separator placed at the lower end to collect the fine ore, the sulfurous acid and sulfuric anhydrid are drawn off and converted into sulfuric acid, and the fine ore taken to the lixiviating tanks where the copper is extracted by water and dilute acids and recovered as cement copper.

What I claim is:—

The process of treating copper bearing pyrites, sulfid ores and mattes, consisting in reducing the same to a pulverulent condition, then injecting the same by means of an air blast or fan or blower suction, into a furnace heated to a temperature high enough to at once ignite the sulfur and simultaneously agglomerate the ore and convert the copper into sulfate and oxid, grinding the agglomerated ore, then lixiviating the ore with water and dilute acid to dissolve the copper, and finally precipitating the copper.

In testimony whereof, I have hereunto set my hand.

JOSEPH McFETRIDGE.

Witnesses:
R. G. SCOTT, Jr.,
W. L. DAVIS.